United States Patent [19]
Plume

[11] 3,964,785
[45] June 22, 1976

[54] REVERSIBLE SEAT AND BED APPARATUS
[75] Inventor: Robert W. Plume, Sterling Heights, Mich.
[73] Assignee: Travel Products, Inc., Washington, Mich.
[22] Filed: June 21, 1974
[21] Appl. No.: 481,604

[52] U.S. Cl. .................................. 297/64; 297/92; 5/47
[51] Int. Cl.² ......................................... A47C 1/032
[58] Field of Search .................. 297/64, 65, 92, 94; 5/47

[56] References Cited
UNITED STATES PATENTS

| | | | |
|---|---|---|---|
| 324,129 | 8/1885 | Livesey | 297/92 |
| 1,608,064 | 11/1926 | Henry | 297/65 X |
| 2,261,519 | 11/1941 | Jones | 297/65 |
| 2,297,176 | 9/1942 | Thompson | 297/64 |
| 2,304,199 | 12/1942 | Pinnow | 297/64 X |
| 2,625,693 | 1/1953 | Raginsky | 5/47 |
| 2,655,197 | 10/1953 | Schofield | 297/65 X |
| 2,672,625 | 3/1954 | Rhodes | 5/47 |
| 3,630,569 | 12/1971 | Lory | 297/64 |
| 3,743,350 | 7/1973 | Allen | 297/64 |
| 3,844,608 | 10/1974 | Freedman | 297/92 |

Primary Examiner—Francis K. Zugel
Attorney, Agent, or Firm—Reising, Ethington, Barnard

[57] ABSTRACT

Seating apparatus is disclosed which is adapted to provide a forward or rearward facing seat or a bed in a camper type vehicle. The inventive seating apparatus may be used as a forward passenger seat in a van type camper vehicle which has a rear seat with a bed conversion capability similar to that of the seating apparatus of this invention. When the two seats are converted to the bed orientation the combination provides a full sized bed. When desired the rear seat is erected to its forward facing orientation and the seating apparatus of this invention may also be used in the forward facing seat orientation. Alternatively, the forward seat may be reversed so that the seats are in face to face to relation and a table may be placed therebetween for a dining arrangement. The seating apparatus of this invention provides reversibility of the seat from forward facing to rearward facing and mechanism is disclosed which provides the desired seat bottom rake in both orientations and also provides shifting of the cushions so they occupy the same relative position to each other and the base in either orientation. Additionally, the mechanism is effective when the seat is converted to the bed orientation to eliminate the rake of the seat bottom and to draw the cushions together and thus provide a flat continuous mattress surface.

30 Claims, 16 Drawing Figures

REVERSIBLE SEAT AND BED APPARATUS

FIELD OF THE INVENTION

This invention relates to seating apparatus which is convertible between oppositely facing seating orientations and also convertible to a bed orientation; more particularly the invention relates to a mechanism for vehicle seats which enables multiple uses including forward and rearward facing passenger seating, table seating and functioning as a bed.

BACKGROUND OF THE INVENTION

This invention is an improvement over that set forth in my copending U.S. patent application Ser. No. 441,080 filed on Feb. 11, 1974, now U.S. Pat. No. 3,887,229 and assigned to the same assignee. The invention set forth in that patent application is seating apparatus which is convertible from a seat orientation into a bed orientation. The advantages of that invention are retained in the subject invention while enabling the seating apparatus of the subject invention to be reversible between a forward facing and a rearward facing seating arrangement. This is especially useful in a mobile home or camper vehicle so that the same space may be used for passenger seating, sleeping and dining.

It has been known heretofore to provide vehicles with passenger seats which may be changed from forward facing to rearward facing arrangements. This changeability of seating apparatus has been found useful, for example, in vehicle seating where a forward seat is changed from forward facing to rearward facing so that the occupants may be face to face with occupants of a rearward seat. Such an arrangement is convenient for game playing, dining and the like. It is also common knowledge that vehicles may be provided with seating apparatus which is convertible to a bed orientation. However, the prior art leaves much to be desired with respect to the mechanisms by which these conversions are effected; the prior art has been especially deficient with respect to converting seating apparatus between forward and rearward facing orientations and bed orientations.

It is desired therefore to provide vehicle seating apparatus which can be converted from a seat orientation, either forward or rearward facing, to a bed orientation; further, such conversion should be effectuated by simple manual manipulation. The vehicle seating apparatus, whether oriented as a forward facing or rearward facing seat or oriented as a bed, should provide comfort and convenience which is undiminished by the feature of convertibility.

In the prior art it has been proposed to provide vehicle seating apparatus wherein a front seat may be changed from forward facing to rearward facing and to provide for folding the seat back to a prone position for a bed arrangement. This general combination is shown in the Willson U.S. Pat. No. 2,638,374; however the conversion of the seat structure from one orientation to another requires a great deal of mechanical operation and furthermore the basic seat design is unsuitable for current vehicular usage. Another example of prior art seat apparatus intended for providing a forward or rearward facing seat and being convertible for bed use is shown in the Koziol U.S. Pat. No. 3,596,981. This patent discloses a pair of bench-type seats, each having removable back members which may be removed and placed in a prone position for bed use or one of the backs may be removed and reinstalled in a reverse position to form two facing seats.

The prior art has yielded a large number of reversible car seats intended for use in railroad cars or automotive vehicles of various types. These prior art reversible seats may be characterized as being unduly difficult to manipulate and as having greatly compromised a design of the seat or bed in respect to comfort and suitability for vehicle use. An early example of such a reversible car seat is shown in Rideout U.S. Pat. No. 870,385. This patent discloses a seat having a seat back and seat bottom which are interchanged through actuation of a bell-crank lever in order to change the seat from forward facing to rearward facing. A similar arrangement is shown in the Wheatley U.S. Pat. No. 1,051,040 and in the Bugatti U.S. Pat. No 2,004,850. These examples of the prior art regarding reversible seats make no provision for conversion from a seating arrangement to a bed arrangement.

The prior art has failed to produce seating apparatus adapted to be converted from forward facing to rearward facing seat orientation or to a bed orientation while providing attributes of good seat design, such as seat bottom rake, seat cushion overlap relationship and seat bottom fore and aft dimension, along with good bed design including flat surfaces and the absence of a high hinge pivot.

SUMMARY OF THE INVENTION

In accordance with this invention, seating apparatus is provided wherein the same seat back, seat bottom and seat base members are usable and readily convertible to form a forward or rearward facing seat or bed orientation; importantly, each orientation is achieved by merely operating a latch and applying a manual force to a selected portion of the apparatus. This is accomplished by mounting the seat back and seat bottom members on the seat base member through the intermediary of a carrier, which is movable fore and aft, and a mounting plate, which is pivotally supported on the carrier and which pivotally supports one of the seat back or bottom members. A fold latch releasably retains the seat back and seat bottom members in fixed relation or allows one to fold downwardly to the bed orientation. A tilt latch releasably retains the mounting plate in fixed relation to the carrier or selectively allows tilting motion thereof in unison with the seat back and seat bottom members to a reverse seat orientation.

Further, in accordance with this invention, the seat bottom and back members are disposed in a reverse but otherwise identical relationship with each other and with the base member in both the forward facing and rearward facing orientations. In both orientations seating comfort is enhanced by providing a seat bottom rake, i.e. a slope downwardly and rearwardly. This is accomplished in the normal or forward facing seat orientation by providing the carrier with a suitable inclination when it is in its rearward position. The seat bottom rake for the reverse or rearward facing seat orientation is provided by the tilt latch coacting with the mounting plate.

Also, in accordance with the invention, seat reversal, i.e. pivotal motion between forward facing and rearward facing orientations, is accompanied by shifting motion of both the seat back and seat bottom cushions so that the seat back cushion occupies the same position relative to the seat bottom cushion in both orientations. This feature provides the same front to back dimension for the seat bottom cushion in both orientations and enhances seat comfort. This is accomplished by first and second shift mechanisms which are connected respectively with the first and second cushion holders of the seat bottom and back members, the shift mechanisms being automatically operable as an incident to the pivotal motion of the mounting plate relative to the carrier. The shift mechanisms preferably comprise articulated rigid pivotal links and hence are reversibly operable.

Additionally, in accordance with this invention, the seat apparatus is convertible to the bed orientation to provide a flat bed surface without a gap in the mattress (between cushions) and without any mechanism protruding above the lower surface of the mattress. This is accomplished in conjunction with the aforementioned seat reversing features by use of a low hinge pivot between the seat back and bottom members, together with shifting means for one of the cushion holders which is operable as an incident to the folding of the seat back to the prone position to draw the seat back cushion toward the hinge pivot and hence the other seat cushion to close the gap therebetween. Further, in accordance with this invention, the same shift mechanism is used for actuating the seat back cushion holder during a seat reversing procedure as during the seat-to-bed conversion procedure. This is accomplished by the combination of a crank member operated by folding of a seat member or tilting of the seat members in unison, the crank member being connected to the shiftable cushion holder through a pair of articulated links which are guided on the carrier. The use of the same shift mechanism for causing cushion holder shifting during both seat reversal and seat-to-bed conversion is enabled by placement of the hinge pivot axis and the mounting plate pivot axis in close juxtaposition. The elimination of the seat bottom rake when converting to the bed orientation to provide a flat bed is achieved by the translation mechanism which includes the carrier. For this purpose the translation mechanism changes the inclination of the carrier as it is moved from its rearward to its forward position, preferably by supporting the carrier on ramp means and a pivotal link.

DETAILED DESCRIPTION

A more complete understanding of this invention may be obtained from the detailed description that follows, taken with the accompanying drawings in which.

Referring now to the drawings, there is shown an illustrative embodiment of the invention in a convertible and reversible seat especially adapted for use as a passenger seat, a dinette seat or a bed in a motor vehicle, such as a mobile home or a van type camper vehicle. It will be appreciated, as the description proceeds, that the invention is not limited to such applications but may be used wherever it is desired to provide a reversible seat.

GENERAL ARRANGEMENT

Figure 1:
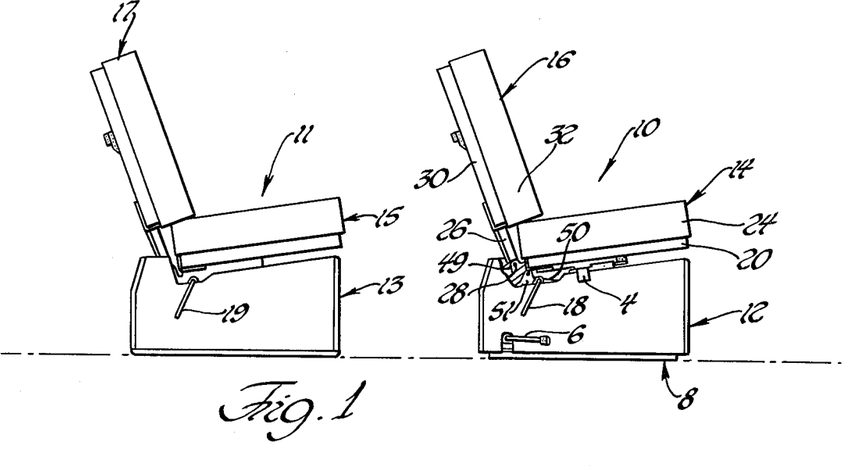
FIG. 1 shows front and rear seats with the front seat being constructed according to this invention and disposed in the normal seat orientation.

As shown in FIG. 1, a pair of seats 10 and 11, according to the invention, are arranged as front and rear seats in fore and aft alignment. In a van installation the convertible seats would be disposed rearwardly of the vehicle driver's seat and opposite the side doors of the van. The seat 11 is convertible and is constructed in accordance with the disclosure of the above-identified U.S. patent application Ser. No. 444,080. The seat 11 comprises in general, a base member 13 which is suitably secured to the vehicle floorboard and which supports a seat bottom 15 and a seat back 17. A latch actuating handle 19 is accessible at the side of the seat for performing operations requisite to converting from a seat orientation to a bed orientation. It is noted that the seat 11, as shown in FIG. 1, is provided with a seat bottom rake, i.e. the seat bottom slopes downwardly to the rear with the desired degree of inclination for seating comfort.

The seat 10 is convertible and reversible and is constructed in accordance with this invention. The seat 10 comprises, in general, a base 12 which is mounted on a positioning mechanism 8 which in turn is secured to the vehicle floorboard. The base 12 supports a seat bottom 14 and a seat back 16. A seat positioning latch handle 6 is operable to permit positioning of the seat in the fore and aft direction by means of the seat positioning mechanism 8. A seat conversion latch handle 18 is operable for performing operations requisite to conversion from a seat orientation to a bed orientation or to a reverse seat orientation. A seat reversing latch handle 4 is operable to permit tilting of the seat from a normal seat orientation to a reverse seat orientation. The seat 10 is provided with a seat bottom rake to provide seating comfort when in the normal seat orientation, as shown in FIG. 1.

Figure 2:
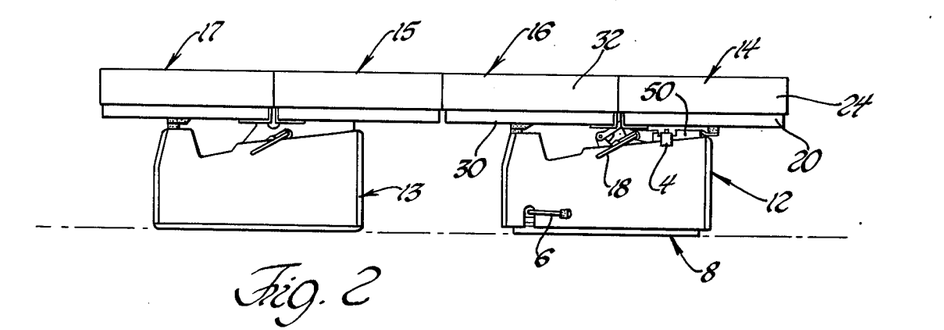
FIG. 2 shows the seats of FIG. 1 disposed in a bed orientation.

The seats 10 and 11 of FIG. 1, after conversion to a bed orientation, are illustrated in FIG. 2. It is noted that the seat bottoms 14 and 15 have been moved forwardly on the respective bases 12 and 13 and the rake of the seat bottoms is eliminated. Thus with the seat backs 16 and 17 folded to the prone position a flat bed is provided, i.e. all of the sections are in a horizontal position.

Referring further to FIGS. 1 and 2, the seat bottom 14 comprises a cushion holder or seat support member 20 including a frame member 21 (see FIG. 4) which is mounted upon a carrier 50 which, in turn, is movably supported on the seat base 12 in a manner to be described. A seat cushion 24 is disposed on the seat support member 20 and secured thereto in a suitable manner. The seat back 16 comprises a seat support member or cushion holder 30 including a frame member 26 pivotally mounted on a sector plate 49 by a hinge pivot 28. The sector plate is mounted upon a carrier 50 by a pivot pin 51. The seat back and seat bottom cushion holders are movable to and from the hinge pivot 28 in a manner to be described later. A seat back cushion 32 is suitably secured to the cushion holder 30.

In the bed orientation, as shown in FIG. 2, it is noted that the hinge pivot 28 is disposed below the supporting surfaces for the cushions 24 and 32, which constitute part of the bed mattress. This obviates the problem of hard objects being disposed above the level of the mattress base which might cause discomfort or injury. Additionally, it is noted that the seat back cushion 32 in the prone position in the bed orientation is disposed in edge to edge engagement with the seat bottom cushion 24, i.e. there is no gap therebetween which would lend discomfort to the mattress. The closing of the gap between cushions 24 and 32, as noted in FIG. 2, is effected by sliding the cushion holder 30 toward the hinge pivot 28 which, as will appear hereinafter, is accomplished coincidentally with folding of the seat back 16 to the prone position. Additionally, it is noted that in the bed orientation of FIG. 2 the seat back cushion 32 of the seat 10 and the seat bottom cushion of the seat 11 are in edge to edge engagement to provide a continuous mattress surface for the bed. For this purpose the seats 10 and 11 are spaced in the fore and aft direction, for the bed orientation, so that corresponding points on the base members 12 and 13 are spaced a distance equal to the sum of horizontal dimension of the seat bottom 14 in the prone position and the horizontal dimension of the seat back 16 in the prone position.

Figure 3:
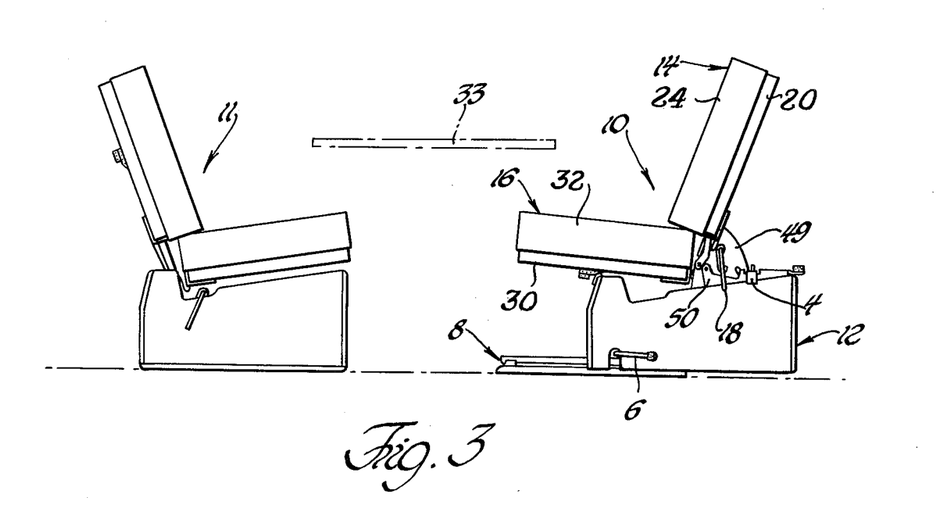
FIG. 3 shows the seats of FIG. 1 disposed in a dinette arrangement with the front seat in a reverse orientation.

The seats 10 and 11 of FIG. 1 are shown in FIG. 3 in facing relationship, such as that used for a table seating or dinette arrangement. In this arrangement the rear seat 11 remains unchanged from its position and orientation shown in FIG. 1. A dinette table 33 is shown in phantom lines between the seats 10 and 11 and is suitably of the type used in van type camper vehicles and supported in cantilever fashion from the side wall. The seat 10, as shown in FIG. 3, is disposed in its reverse orientation and at a distance from seat 11 sufficient to allow comfortable leg room between the seats. For this purpose the seat base 12 is disposed at the forward (with reference to vehicle direction) end of the positioning mechanism 8. Additionally, the seat member 14 has been moved from the seat bottom position shown in FIG. 1 to the seat back position as shown in FIG. 3. Similarly, the seat member 16 has been moved from the seat back position shown in FIG. 1 to the seat bottom position shown in FIG. 3. It is to be noted that seat 10, in the normal orientation of FIG. 1 and in the reverse orientation of FIG. 3, has the seat bottom member provided with a desired rake and the seat back cushion overlies the seat bottom cushion, so that the fore and aft seating space is the same for both orientations. The seat bottom rake and seating space which provides seating comfort in both normal and reverse orientations is automatically provided by relative shifting motion of the seat members 14 and 16 coincidentally with the tilting of the seat 10 from one orientation to the other by a shifting mechanism which will be described subsequently.

Figure 4:
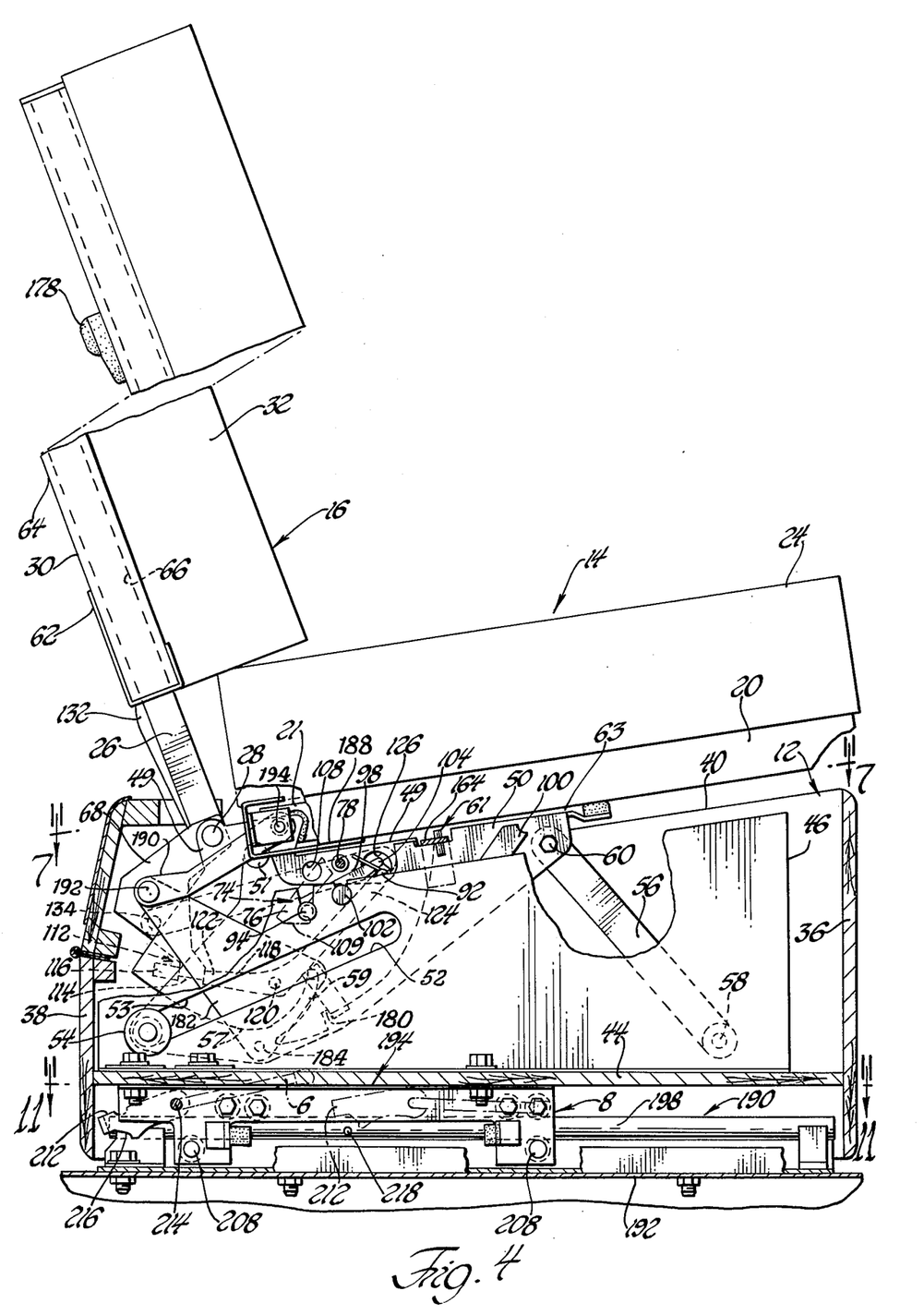
FIG. 4 is a side elevation view of the front seat with parts cut away to reveal the seat converting, reversing and positioning mechanism with the seat in the normal seat orientation.

Referring now to FIG. 4, the seat converting and reversing mechanism is shown in detail with the seat 10 in the normal seat orientation. It is observed at this point that the seat is provided with dual mechanisms and, with the exception of the illustrations of FIGS. 7, 8, 14 and 15, only one such mechanism is shown in the drawings. The description will be given with respect to the mechanism disposed at the right-hand side of the seat 10 in its normal orientation and, with the exceptions noted herein, the mechanism at the left-hand side of the seat is a mirror image of the one to be described.

As mentioned above, the term "converting mechanism" refers to that portion of the mechanism which enables the seat to be converted from a seat orientation to a bed orientation; the term "reversing mechanism" refers to that portion of the mechanism which enables the seat to be changed from a forward facing or normal orientation to a rearward facing or reverse orientation. As the description proceeds it will be apparent that the converting mechanism utilizes the same principle of operation as that disclosed in the above-identified U.S. patent application Ser. No. 441,080. The construction of the converting mechanism is the same as that disclosed in said U.S. patent application Ser. No. 441,080 except for certain changes, as will be evident hereinafter, which allow the reversing mechanism to be integrated therewith. In effect, this integration of the mechanisms may be regarded as the interposition of the reversing mechanism between the translating mechanism and the converting mechanism, the latter two mechanisms being disclosed in said U.S. patent application Ser. No. 441,080. In view of this relationship between the subject matter of this application and the said application Ser. No. 441,080, the disclosure of the said U.S. patent application Ser. No. 441,080 hereby incorporated by reference into this patent application.

Figure 5:
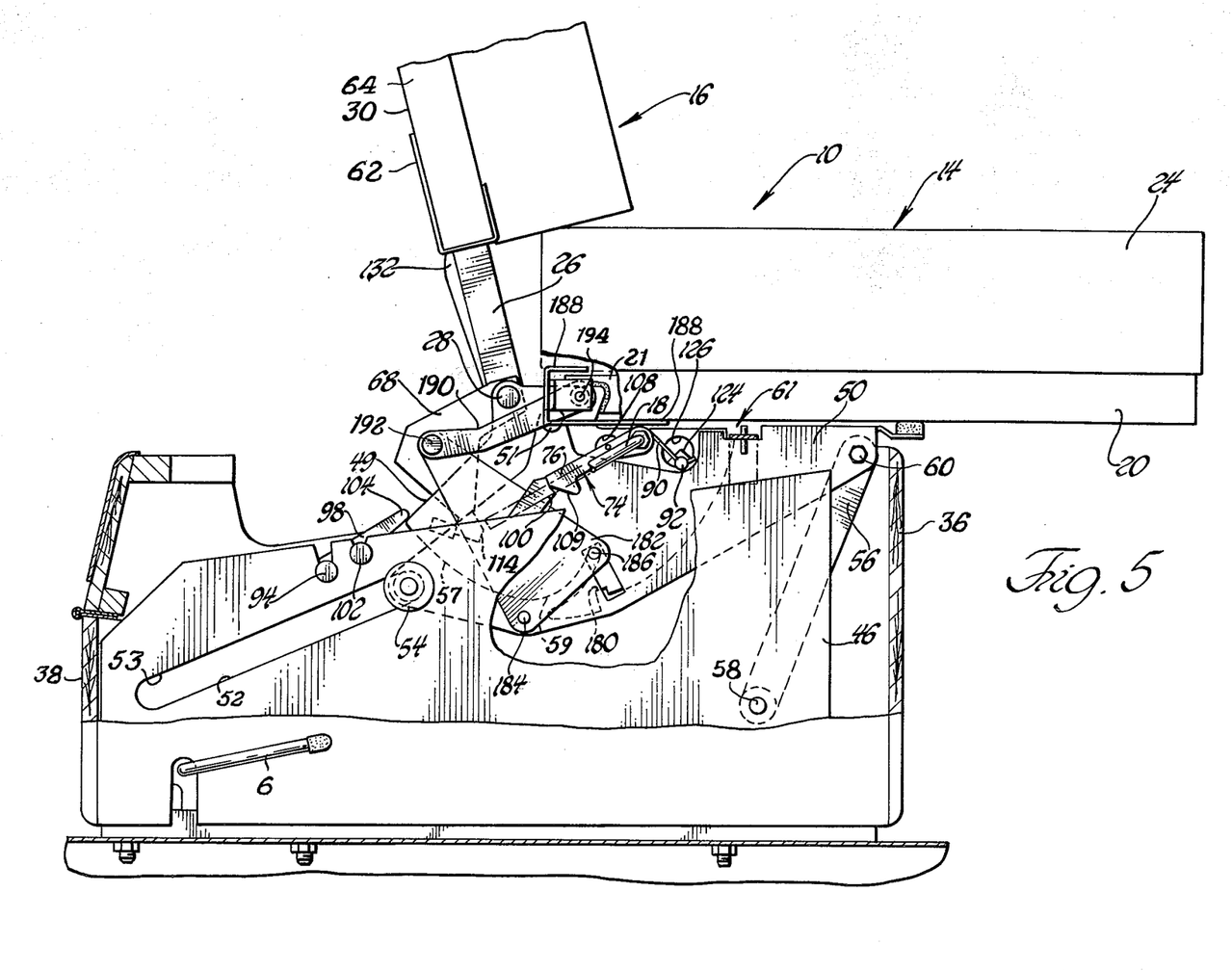
FIG. 5 is a side elevation view showing the seat mechanism with the seat in an intermediate orientation.
Figure 6:
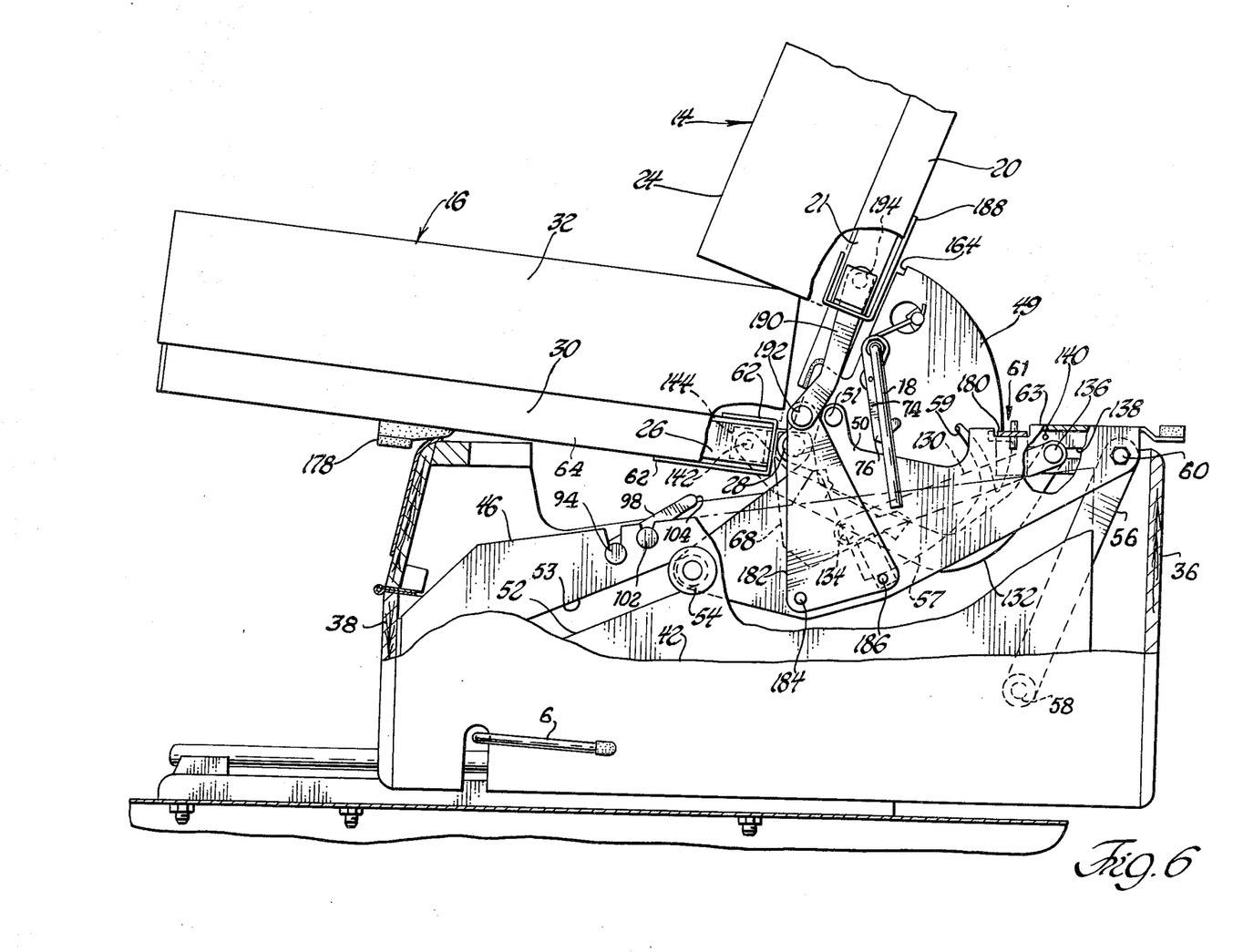
FIG. 6 is a side elevation view showing the seat mechanism in the reverse seat orientation.

As shown in FIGS. 4, 5 and 6, the base 12 is a boxlike structure, suitably of wood and includes front and back walls 36 and 38, a left end wall 40, a right end wall 42 and a bottom plate 44. The bottom plate 44 separates the base into a lower compartment, which houses the positioning mechanism 8, and an upper compartment which houses the translating, converting and reversing mechanisms. The base also includes a right end plate 46 attached, suitably by screws, to the inner surface of the right side wall 42. The plate 46 is preferably constructed of sheet steel and is generally of rectangular configuration. As noted above, the seat mechanism which is about to be described including the end plate 46, is duplicated in mirror image at the left side of the seat. The description, however, will be given explicitly with reference to the mechanism on the right-hand side of the seat and occasional reference will be made to the corresponding mechanism on the left-hand side.

TRANSLATING MECHANISM

According to this invention, the first step in effecting the conversion from the normal seat orientation to the bed orientation or to the reverse seat orientation is that of moving the seat with its seat back erected, as illustrated in FIG. 4, to a forward position in which the rake of the seat bottom 14 is eliminated. This forward movement or travel of the seat assembly is accomplished by means of the translating mechanism including the carrier 50 which is movably mounted upon the base 12. The carrier 50, as depicted in FIG. 4, comprises a somewhat triangular metal plate which has its left-hand lowermost corner supported by a ramp means which includes a ramp surface or track 52 formed in the end wall 42 as a track for a ramp follower or roller 54, which is rotatably mounted on the carrier 50. The roller 54 (see FIG. 6 also) is mounted by means of a stub shaft extending from the carrier 50 through a slot 53 in the end plate 46 with the slot being narrower than the track 52 and thus forming a retaining guideway for the roller. The forward corner of the carrier 50 is supported on the end wall 42 by means of a pivot link 56 which is pivotally connected by a pivot pin 58 to the end wall and pivotally connected by a pin 60 to the carrier 50.

The seat frame member 21 which carries the seat member 14 is rigidly mounted on a mounting or sector plate 49 by a weldment. The sector plate 49 as shown in FIG. 4 is generally of quadrant shape and includes a cam surface 57 extending into an arcuate slot 59 for a purpose to be described later. The sector plate, which constitutes a major part of the reversing mechanism, is pivotally mounted by the pivot pin 51 upon the carrier 50 for translatory movement therewith. The sector plate 49 is restrained against pivotal motion relative to the carrier 50 by a tilt latch 61 which selectively locks or unlocks plate 49 to or from the carrier 50 in a manner to be described later.

The seat member 16 includes a support member or cushion holder 30 with a frame member 26 and is supported upon the sector plate 49, and hence on the carrier 50, by a hinge pivot 28 which extends through the frame member 26. The cushion holder 30 of seat member 16 includes a steel bracket 62 and a back plate 64, suitably of plywood, which is mounted in the bracket 62. The seat cushion 32 is mounted on the forward surface of the back plate 64 in a suitable manner. As will be described subsequently, the cushion holder 30 is slidably or reciprocably mounted on the frame member 26 which extends into a passage 66 in the back plate 64 and abuts a compression spring (not shown). Thus it can be seen that the seat member 16 and the seat member 14 are both mounted upon the carrier 50 for movement therewith relative to the base 12.

Figure 7:
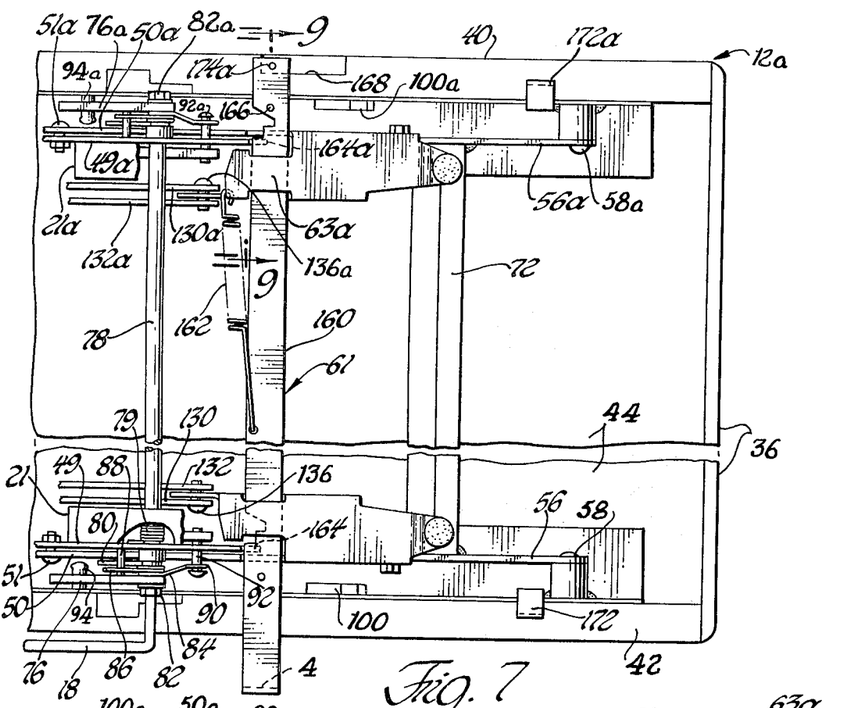
FIG. 7 is a plan view of the mechanism with the seat in the normal seat orientation; with certain components thereof removed for clarity

Before proceeding with the description of the translating mechanism and fore and aft travel of the carrier 50, and hence the seat bottom 14 and seat back 16, reference is made to FIG. 7 which depicts one view of the seat mechanism on the right side, which is being discussed in detail, and also depicts the seat mechanism on the left side, which is a mirror image of that being described in detail. For convenience, parts in the left-hand mechanism of FIG. 7 which correspond to those in the right-hand mechanism are designated by the same reference character with the addition of the letter a. The right-hand and left-hand seat mechanisms are operated in synchronism by reason of several cross-ties or links which are best shown in FIG. 7. First it is noted that the seat frame member 21 is supported by the right-hand sector plate 49 and hence the seat frame member 21a is carried by the left-hand sector plate 49a and hence carrier 50a. Additionally, the seat member 16 is supported by right-hand frame member 26, as described above, and is also supported by a left-hand frame member 26a in the same manner. Accordingly, the seat member 16 and the seat member 14, being supported by both the right-hand and left-hand mechanisms and being of rigid frame construction, serves to interconnect the dual mechanisms. To supplement this interconnection and to cause the dual mechanisms to move in unison or synchronism, a cross link or bar 70 (see FIG. 8) extends between the left and right-hand mechanisms and is secured at opposite ends to the frame members 26 and 26a through the intermediary of respective crank members or plates 58 and 68a which serve additional functions to be described later. Similarly, a cross link or bar 72 (see FIG. 7) extends between the right and left-hand mechanisms and is secured at its opposite ends to the pivot link 56 and the corresponding pivot link 56a of the left-hand mechanism. The cross links or bars 70 and 72 are suitably rectangular steel tubing and are secured to the respective plates and links by means of welding. As the description proceeds, it will be understood that movements of the right-hand mechanisms will be accompanied by corresponding movements of the left-hand mechanism by reason of the cross-ties or links as just described.

TRAVEL LATCH

With the seat in the normal seat orientation, as shown in FIGS. 1 and 4, the seat 14 is positively latched in fore and aft position by a travel latch 74. As shown in FIGS. 5 and 7, the travel latch comprises a latch lever or pawl 76 which is pivotally mounted on the sector plate 49 by a cross-rod or latch shaft 78. The latch pawl 76 is mounted upon the latch shaft by means of the latch handle 18 which is of L-shape and which has a threaded end screwed into a tapped bore in the end of the latch shaft 78. As shown in FIG. 7, the threaded end of the latch handle 18 passes through an opening in the latch pawl 76 and is held in position adjacent the end of the latch shaft by a nut and washer 82. The latch pawl 76 is rotatably mounted relative to the latch shaft 78 and the latch handle 18 and is spring biased in a counterclockwise see FIG. 16 by means of a helical spring 84 mounted on the latch shaft 78 and having one end 86 bearing upon the latch pawl 76 through the intermediary of a drive pin 88. The other end 90 of the spring 84 bears against another drive pin 92 which is part of another latch to be described subsequently. The travel latch pawl 76 is actuable in the clockwise direction by an actuator pin 80 which extends radially through the latch shaft 78 and through the inner end of the latch handle 18. The latch shaft 78 and hence the latch handle 18 are biased toward a neutral or latching position by a torsion spring 79 (see FIG. 7) disposed on the shaft 78. The spring 79 has one end anchored to the shaft 78 and the other end anchored to the sector plate 49 by extending into an opening 126 in the sector plate.

The travel latch 74 further comprises a rear striker 94 which is engageable by the pawl 76, as shown in FIG. 4, with the seat in the rear position. The rear striker 94, which takes the form of a headed pin, is mounted on the end plate 46. A stop plate 98 is mounted on the inner end of the striker 94 and on the inner end of a headed pin 102 which has the same construction as the striker 94 and extends also from the end plate 46. The stop plate has a nose portion 104 which is disposed adjacent the drive pin 92, when the seat is in the normal orientation position as shown in FIG. 4. Referring again to the latch pawl 76, as shown in FIG. 4, it will be noted that the pawl is provided with a hook portion which is adapted to engage the striker 94 and thus the latch 74 prevents forward travel of the seat when the latch pawl is in the position shown. In order to release the travel latch 74 the latch handle 18 may be rotated in the clockwise direction (from the right-hand end of the seat) and the actuator pin 80 engages the drive pin 88 and rotates the latch pawl 76 in the clockwise direction to lift it from the rear striker 94. The latch pawl 76 is provided with an inclined nose portion 109 which, in rearward movement of the seat, engages the pin 102 and the striker 94 successively and is cammed thereover against the bias of the spring 84. The travel latch also includes a forward striker 100 mounted on the end plate 46. The forward striker 100 is engaged by the pawl 76 with the seat in the intermediate position, as will be described below.

The first step in effecting the conversion from the normal seat orientation to the bed orientation and to the reverse seat orientation will now be described. The first step is to cause forward travel of the seat to the intermediate position shown in FIG. 5. In order to permit forward motion of the seat, the latch handle 18 is operated to release the travel latch 74. With the latch in the released position, a manual force in the forward direction upon the seat back or seat bottom causes the carrier 50 to move forwardly. This forward motion of the carrier 50 is accommodated by the motion of the roller 54 along the ramp 52 and also by the forward pivotal motion of the pivot link 56 about its fixed pivot pin 58. Referring now to FIG. 5, the seat is shown in its forward position with the roller 54 at the upper end of the ramp 52 and with the pivot link 56 inclined forwardly. In this position the travel latch pawl 76 has its outer end in abutting engagement with the front striker 100 which holds the seat in the forward position. In this forward position the ramp means 52 and 54 and the pivot link 56 support the carrier 50 so that the seat bottom rake is eliminated and the cushion 24 is supported in a horizontal position.

CONVERTING MECHANISM AND FOLD LATCH

With the seat in the normal seat orientation as shown in FIG. 4 and also with the seat in the intermediate position as shown in FIG. 5 the seat back is held in the erect position by means of a fold latch 112. Referring again to FIG. 4, it was noted above that the crank member or plate 68 is fixedly mounted with respect to the frame member 26 and is pivotable therewith about the hinge pivot 28. The crank plate 68 is provided at its lower end with a latch element or tang 114 which, with the seat back in the erect position, abuts against a stop element 116 which is mounted on the sector plate 49. A fold latch pawl see also FIGS. 14 and 16 of L shape is pivotally mounted on a sector plate 49 by a pin 120. The lower end 122 of the pawl 118, when in the latching position, is in abutment with the latch tang 114. Thus, in the latching position of the pawl 118, the tang 114 is confined between the stop element 116 and the end 122 of the pawl. In this position the crank plate 68 and hence the frame member 26 are prevented from pivotal motion about the hinge pivot 28. Referring again to the fold latch pawl 118 the upper end 124 carries a headed drive pin 92 which extends through an opening 126 in the sector 49 and is biased downwardly by the end 90 of the helical spring 84. The fold latch pawl 118 is releasable from the latch tang 114 by rotation in a counter-clockwise direction as viewed in FIG. 4. For this purpose the actuator pin 80 which is carried by the latch shaft 78 (FIG. 8) operatively engages the drive pin 92 by counterclockwise rotation of the latch handle 18 and lifts the upper end of the pawl 118 against the bias of the spring 84. When the pawl 118 is rotated counterclockwise by the latch handle, the latch tang 114 on the crank plate 68 clears the lower end 122 of the latch pawl and the crank plate 68 and hence, the frame member 26, are free to rotate in a counterclockwise direction about the hinge pivot 28 and the seat member 16 may be folded to the horizontal or prone position FIG. 14. With the seat in the intermediate position as shown in FIG. 5, it may be converted to the bed orientation by operation of the fold latch in the manner just described. (Also it may be tilted to the reverse orientation from the intermediate position, as will be described below). At this point the mechanism for conversion to the bed orientation will be described.

When the seat member 16 is folded to the prone position for the bed orientation, the cushion holder 30 is drawn toward the hinge pivot 28 by linkage which will now be described. In order to impart motion to the cushion holder 30 in synchronism with the folding of the seat member 16 to the prone position and vice versa, a shaft mechanism is provided for the seat member 16 see FIG. 14. This includes the crank plate 68 which is connected by way of a push link 130 and a drag link 132 to the cushion holder 30 which is reciprocably movable on the seat back frame member 26. (See FIG. 8 and also FIG. 6). It is noted that the push link 130 is pivotally connected to the crank plate 68 by a pivot pin 134 and is formed as a straight rigid link. The forward end of the push link 130 is pivotally connected to the forward end of the drag link 132 by pivot pin 136. The drag link 132 is of boomerang configuration for the purpose of providing proper clearance from other portions of the mechanism. The pivot pin 136, which connects together the forward ends of the push link 130 and drag link 132, extends through a guide slot 138 in a vertical flange 140 which extends downwardly from the horizontal flange 63 of the carrier 50. The upper end of the drag link 132 is pivotally connected to the cushion holder 30 by way of a pivot pin 142 and a flange 144 formed integrally with the support bracket 62. Thus, it can be seen that downward folding motion of the seat member 16 causes the crank plate 68 to thrust the push link 130 forward in the guide slot 138; this carries the drag link 132 forward therewith which in turn pulls the cushion holder 30 downwardly toward the hinge pivot 28 along the seat back frame member 26. This places the seat in the bed orientation as shown in FIG. 2.

REVERSING MECHANISM AND REVERSING LATCH

With the seat 10 in the intermediate position, as shown in FIG. 5, it is in a state of readiness for tilting to the reverse orientation which is shown in FIG. 6. (As previously noted, it is also in readiness for folding to the bed orientation.) The reversing mechanism will be described with reference to FIGS. 5 through 10.

Figure 8:
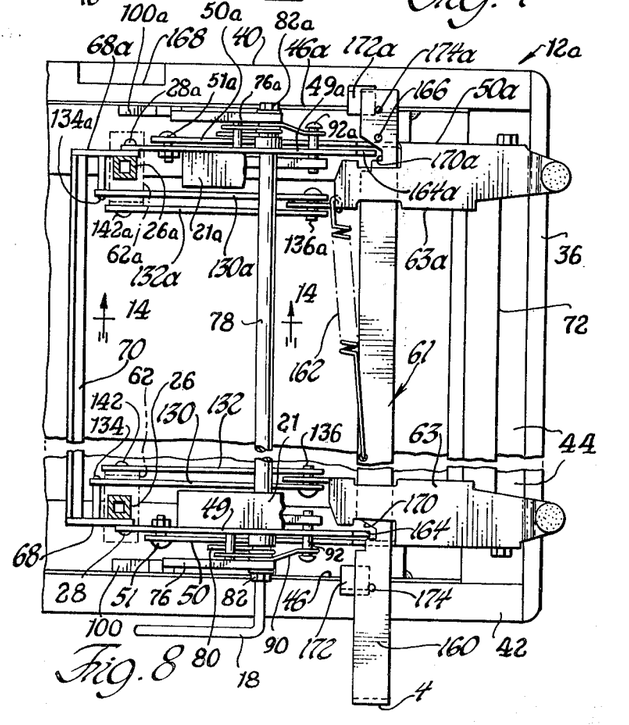
FIG. 8 is a plan view with the seat in the intermediate orientation; with certain components thereof removed for clarity
Figure 9:
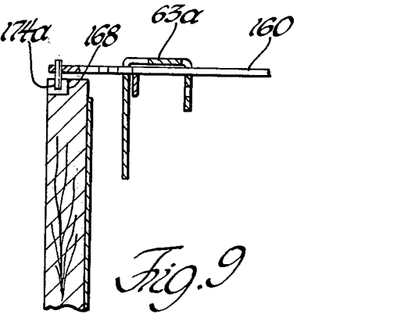
FIG. 9 is a view taken on lines 9—9 of FIG. 7.

The sector plate 49, as previously described is mounted upon the carrier 50 by a pivot pin 51 and hence is translationally movable with the carrier. The sector plate 49 is restrained against pivotal motion relative to the carrier 50 by a tilt latch 61 which selectively locks or unlocks the sector plate to or from the carrier 50. The reversing or tilt latch, as best shown in FIG. 8 with the seat in the intermediate position, comprises a latch bar 160 which extends transversely of the seat and which is provided with an operating handle 4 on the right-hand side thereof (with the seat in its normal orientation). The tilt latch bar 160 is slidably mounted at its right-hand end in the carrier 50 and, at its left-hand end in the carrier 50a. The latch bar 160 extends through slots in the carriers 50 and 50a and is disposed beneath the horizontal flanges 63 and 63a thereof. The latch bar is spring biased toward a locking or full-latch position by means of a tension spring 162 having one end anchored in the carrier 50a and the other end connected with the latch bar 160. The latch bar is shown in its full-latch position in FIGS. 5 and 7 wherein the mechanism is depicted in the normal seat orientation. In the full-latch position, i.e. with the latch bar retracted by the spring 162 to its extreme left-hand position relative to the seat, the latch bar overlies an upwardly facing shoulder 164 on sector plate 49 and a similar shoulder 164a on sector plate 49a. Thus, the latch bar 160 blocks upward pivotal motion of the sector plate 49. Downward pivotal motion of the sector plate is, of course, blocked in the normal orientation as shown in FIG. 4 by the seat support member 20 which rests upon the carrier 50 and the carrier 50a. With the seat in the normal orientation, as shown in FIG. 7, the latch bar 160 cannot be moved from the full-latch position due to a stop pin 174a extending through the left end of the latch bar 160 opposite a shoulder 168 in the left end wall 40 (see FIG. 9). When the seat is moved to the intermediate position, as shown in FIG. 8, the movement of the translation mechanism causes the stop pin 174a to be lifted upwardly and forwardly so that it clears the end wall 40 and allows the latch bar 160 to be pulled outwardly from the seat by the handle 4. As shown in FIG. 8, the latch bar 160 is fully extended against the tension of spring 162 to the unlatched position wherein a stop pin 166 engages carrier 50a; in this position a notch 170 in the latch bar is disposed opposite the shoulder 164 on the sector plate 49 and a notch 170a is disposed opposite the shoulder 164a on the sector plate 49a. Accordingly, the sector plate clears the latch bar and is free to pivot in a counterclockwise direction, as viewed in FIG. 5. Thus, the seat may be tilted from the intermediate position, as shown in FIGS. 5 and 8, to the reverse orientation, as shown in FIG. 6, by a manual upward force on the seat member 14 or a manual rearward force on the seat member 16. In order to prevent this tilting force from causing translational movement of the seat from the intermediate position to the normal orientation on the translation mechanism previously described, restraining means in the form of a flange 172 and stop pin 174 and a flange 172a and the pin 174a are provided. The flanges 172 and 172a are mounted on the end plate 46 and end plate 46a respectively. The stop pins 174 and 174a are inserted in the latch bar 160 and extend downwardly therefrom. As shown in FIG. 8, when the latch bar 160 is extended to the unlatched position the stop pins 174 and 174a are disposed opposite the flanges 172 and 172a, respectively, so that rearward translational motion of the seat is prevented. With the tilt latch 61 in the unlatched position, as described above, a tilting force applied to the seat member 14 or seat member 16 in the counterclockwise direction causes the sector plate 49 and the seat members 14 and 16 to be rotated in unison about the pivot pin 51, which mounts the sector plate onto the carrier 50. This tilting movement places the seat in the reverse orientation, as shown in FIG. 6, wherein the seat member 16 has come to rest with the cushion holder 30 supported upon the seat base through the intermediary of a pad 178. In this seat orientation the sector plate 49 is held in position by the latch bar 160 which, upon release, is retracted by the spring 162 to a half-latch position depicted in FIG. 10. The movement of the latch bar by the spring is limited by a shoulder 171 on the bar which engages the face of the sector plate 49. In this halflatch position a shoulder 173 bounding the notch 180 in the periphery of the sector plate 49 holds the sector plate with the seat in the reverse orientation. Also rearward translation of the seat is blocked by the stop pins 174 and 174a which engage the flanges 172 and 172a, respectively.

It is noted with reference to FIGS. 4 and 6, that seat member 14 is the seat bottom in the normal orientation of FIG. 4 and serves as the seat back in the reverse orientation of FIG. 6; similarly, the seat member 16 is the seat back in the normal orientation and is the seat bottom in the reverse orientation. It is further noted that the seat back cushion in both the normal orientation and the reverse orientation overlies the seat bottom cushion and the seat bottom in both orientations is provided with a desired rate for seating comfort. Also, the seat back and seat bottom are disposed at a predetermined angle relative to each other to enhance seating comfort in both orientations. This reversal of the seat members is brought about by the reversing mechanism which includes means for shifting the cushion holders relative to each other along the respective seat frames, i.e. toward and away from the hinge pivot 28 as the seat members are tilted about the sector pivot axis.

To accomplish the desired shifting of the seat members 14 and 16 during the tilting movement of the seat between normal and reverse orientations, a seat shift mechanism is provided for each seat member. The shift mechanism for the seat member 16 is basically the same as that which shifts the cushion holder 30 when the seat is folded from the normal orientation to the bed orientation, as previously described. This shaft mechanism comprises a crank plate 68 which is nonrotatably secured to the frame member 26 and which rotates therewith about the pivot pin 51 which mounts the sector plate 49 to the carrier 50. This shift mechanism further includes the pushlink 130 and the draglink 132 which, as shown in FIG. 6, are connected respectively with the crank plate 68 by a pivot pin 134 and with bracket 62 by a pivot pin 142. The push-link 130 and drag-link 132 are connected together by a pivot pin 136 which is slidably connected to the carrier 50 through the guide slot 138. This shift mechanism for the seat member 16 is actuated by tilting of the seat member in a counterclockwise direction about the pivot pin 51 to change the seat from the intermediate position of FIG. 5 to the reverse orientation of FIG. 6. This tilting motion causes the crank plate 68 to thrust the push-link 130 in the forward direction (rightward as viewed in FIG. 6) which carries the drag-link 132 therewith. The drag-link 132 through the bracket 62 pulls the cushion holder 30 toward the hinge pivot 28 along the frame member 26. Thus, the seat member 16 is positioned as shown in FIG. 6 in the reverse orientation.

The shift mechanism for the seat member 16 serves to shift the cushion holder when changing the seat between forward and reverse orientations and also when changing between the forward seat orientation and the bed orientation. Furthermore, the shift mechanism is effective to cause the seat member 16 to have a flat or horizontal position in the bed orientation and to have a desired rake when in the reverse seat orientation. In general, this is accomplished by rotation of the seat member 16 about a first horizontal axis (hinge pivot 28) for changing between seat and bed orientations and by rotating seat member 16 about a second horizontal axis (pivot pin 51) when changing between forward and reverse seat orientations. The relationship between the first and second horizontal axes (i.e. hinge pivot 28 and pivot pin 51) will be described with reference to FIGS. 5 and 6. With the seat in the forward or intermediate position (and forward facing), as shown in FIG. 5, the conversion to the bed orientation is completed by folding or pivoting the seat member 16 counterclockwise to a horizontal position. This folding or pivotal motion of the seat member 16 occurs about the hinge pivot 28 which lies in the same plane as the horizontal center line of the frame member 21 for the seat member 14. This folding or pivotal motion of the seat member 16 causes the crank member 68 to rotate counterclockwise through an angle equal to the angular travel of the seat member 16 about the hinge pivot 28. This angle is somewhat less than 90°. It will be understood from the description of the shift mechanism for the seat member 16 and from inspection of FIG. 5 that the horizontal component of motion of pivot pin 134 in the push-link 130 will determine the extent of shift motion imparted to the cushion holder 30 on the frame member 26. As previously described, this shift motion, during the conversion from normal seat orientation to bed orientation, is just enough to close the gap between the cushions of seat member 16 and seat member 14. This requires a relatively large amount of shift motion and it is provided by a relative location between the pivot pin 134 and the hinge pivot 28 so that the chord of the arc described by pivot pin 134 is approximately parallel to the line of action (i.e. the force direction) of the push-link 130. The location of the hinge pivot 28 being in the same horizontal plane as the horizontal center line of the frame member 21 results in a flat bed, i.e. the cushions of seat members 14 and 16 lie in the same plane. The location of the pivot pin 134 relative to the hinge pivot 28, as just described is effective to cause the shift mechanism to produce the right amount of shift motion to completely close the gap between the cushions. The locations of the hinge pivot 28 and the pivot pin 134 must also be correlated with the location of the pivot pin 51 in order to obtain the desired seat member relationship in the reverse orientation, as will be described below.

In the reverse seat orientation, as shown in FIG. 6, the seat bottom (seat member 16) is provided with a rake having a value of approximately 7° and the seat member 16 is shifted along the frame member 26 toward the hinge pivot 28 so that the seat back (seat member 14) overlaps seat member 16. The extent of shifting motion for the seat member 16 during the reversal of the seat from forward to rearward orientation is sufficient to cause the desired degree of overlap of the seat members but less than that which would cause interference between the bracket 62 and the mechanism adjacent the hinge pivot 28. It can be seen that this shifting motion is less for seat reversal than it is for conversion from seat to bed. Furthermore, it can be seen that seat reversal requires that the hinge pivot 28 be lowered a predetermined distance to provide the desired degree of rake to the seat member 16. This combination of requirements is met by supporting the sector plate 49 by the pivot pin 51 on the carrier 50 with the pivot pin 51 eccentrically located relative to the hinge pivot 28. This eccentric location for the pivot pin 51 is, in general, in the quadrant which lies below and forward of the axis of the hinge pivot 28 when the seat is in its normal or forward facing orientation. It will be recalled that the seat reversal is effected from the normal orientation by folding or rotating the seat member 16 counterclockwise with the pivotal action taking place about the pivot pin 51. This rotation of the seat member causes the crank plate 68 to rotate in unison with the seat member 16 about the pivot pin 51 as the center of rotation. Accordingly, the pivot pin 134 which connects the push-link 130 to the crank plate 68 wheregoes arcuate motion about the pivot pin 51 and the horizontal component of this arcuate motion determines the extent of shift motion which will be imparted to the seat member 16 through the shift mechanism. This shift motion during seat reversal is less than that during seat to bed conversion because the chord of the arc travelled by the pivot pin 134 is at a greater angle to the line of action of the push-link 130 than it is when pivot pin 134 rotates about hinge pivot 28. With the seat in the reverse orientation, the hinge pivot 28 is disposed below and to the rear of the pivot pin 51 because of the counterclockwise rotation of the sector plate 49 about the pivot pin 51. This translation of the hinge pivot 28 imparts the desired degree of rake to the seat member 16.

In summary, the desired action of the shift mechanism for the seat member 16 for both seat reversal and seat-to-bed conversion is obtained by location of the pivot pin 51 eccentrically with respect to the hinge pivot 28 and particularly, with the pivot pin 51 disposed in the quadrant below and to the right of the axis of hinge pivot 28. When the frame member 26 is rotated counterclockwise about the hinge pivot 28 to a horizontal position, the shift mechanism draws the seat member 16 toward the hinge pivot 28 enough to close the gap between the seat members. The exact location of pivot pin 51 relative to hinge pivot 28 is such that when the frame member 26 is rotated counterclockwise about the pivot pin 51 to a typical seat bottom rake angle, such as about 7°, the shift mechanism draws the seat member 16 toward the hinge pivot 28 a lesser distance but enough so it underlies part of the seat member 14; additionally, the hinge pivot 28 is translated to a position below the level of the pivot pin 51 to provide the resultant rake for the seat bottom.

The shift mechanism for the seat member 14 comes into play only during changing of the seat to or from the reverse orientation. This mechanism comprises a follower plate 182, FIG. 6 suitably of triangular configuration, which functions in the manner of a bell-crank. The follower plate 182 is pivotally mounted by a pivot pin 184 on the carrier 50 and carries a follower pin 186 which is disposed in slidable engagement with cam surface 57 which, as mentioned above, extends into the arcuate slot 59 in the sector plate 49. The follower plate 182 is connected with a cushion holder 20 by way of a support bracket 188 therefor by means of a push-pull link 190. The link 190 is connected to the follower plate by a pivot pin 192 and is connected to the bracket 188 by a pivot pin 194. This shift mechanism for the seat member 14 is actuated when the seat members 14 and 16 are tilted in unison to or from the reverse orientation; this tilting motion causes the sector plate 49 to rotate relative to the carrier 50 about the pivot pin 51. When changing from the intermediate position of FIG.

5 to the reverse orientation of FIG. 6 the counterclockwise rotation of the sector plate 49 causes the follower plate 182, by camming action therewith, to be rotated in a clockwise direction relative to the carrier 50 about the pivot pin 184. Accordingly, the push-pull link 190 is thrust by the motion of the follower plate in a direction away from the hinge pivot 28. This causes the cushion holder 20 to be shifted along the support frame 21 away from the hinge pivot 28, thereby providing clearance for the cushion holder 30 and cushion 32 to shift its position beneath the cushion 24. It will now be apparent that the shift mechanism for the seat member 14 and the shift mechanism for the seat member 16 are actuated in a reverse manner when the seat is changed from the reverse orientation to the intermediate position.

POSITIONING MECHANISM

Figure 11:
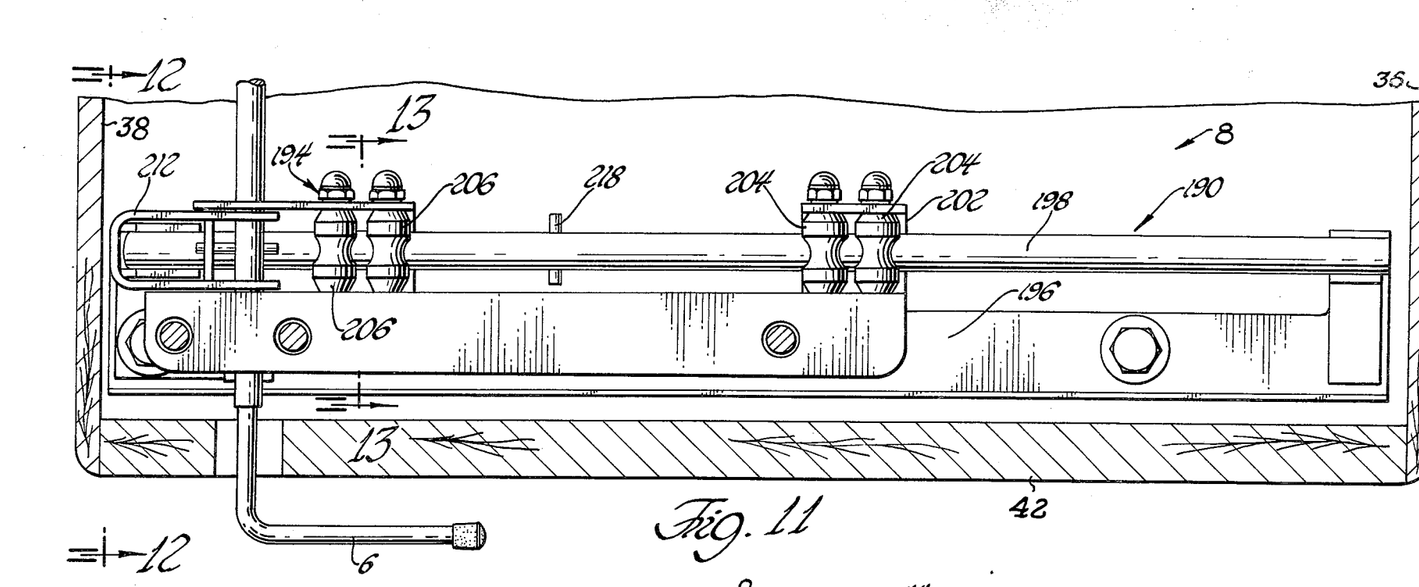
FIG. 11 is a plan view of the positioning mechanism.
Figure 12:
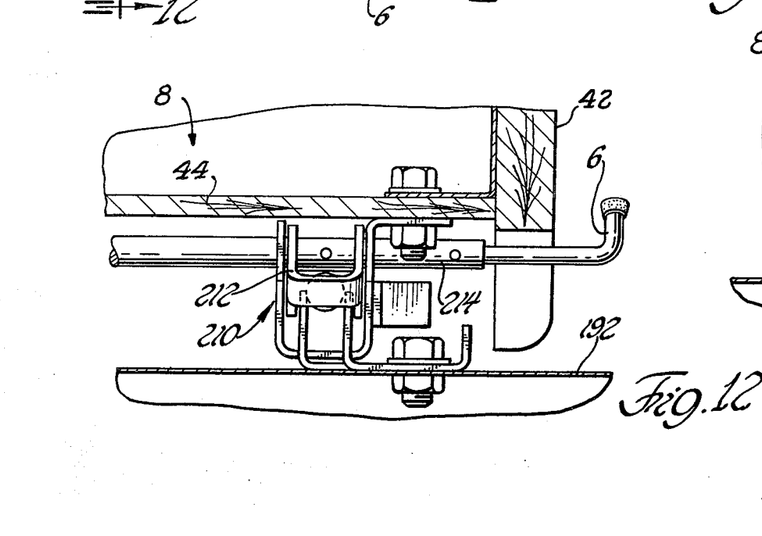
FIG. 12 is a view taken on lines 12—12 of FIG. 11.
Figure 13:
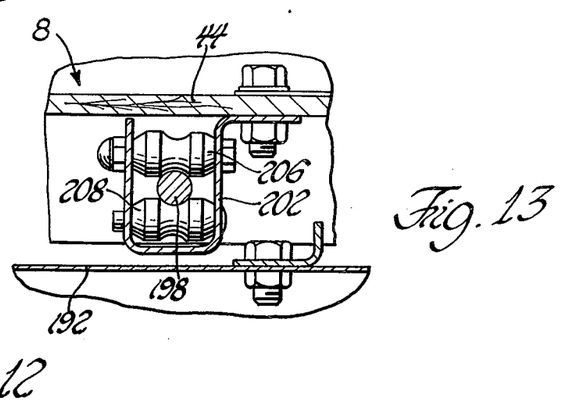
FIG. 13 is a view taken on lines 13—13 of FIG. 11.

The seat positioning mechanism 8, previously alluded to with reference to FIG. 3, is shown in detail in FIGS. 11, 12 and 13. The seat positioning mechanism permits the seat 10 in its reverse orientation to be moved fore and aft relative to the seat 11 and the dinette table 33 to provide comfortable leg room.

As shown in FIGS. 4 and 11, the positioning mechanism comprises, in general, a rail assembly 190 which is secured to the floorboard 192 of the vehicle and a roller assembly 194. It will be understood that the positioning mechanism comprises a right-hand track and roller assembly as shown in FIGS. 4, 11, 12 and 13 and a left-hand track and roller assembly which is of the same construction but not shown in the drawings.

The rail assembly 190 comprises a support bracket 196 and a rail 198 which is supported on the bracket in a horizontal position spaced from the floorboard of the vehicle. The roller or carriage assembly 194 comprises a support member 202 of channel shape having a horizontal flange secured to the underside of the bottom wall 44 of the seat base 12. The support member 202 carries with the channel thereof a forward pair of upper rollers 204 and a rearward pair of upper rollers 206. The upper rollers 204 and 206 ride on the rail 198 and support the weight of the seat 10. The roller assembly also includes lower rollers 208 which engage the rail 198 and keep the seat from being lifted off the rail assembly.

Figure 10:
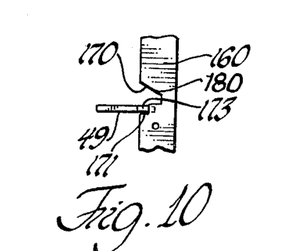
FIG. 10 shows a detail of latch construction.

In order to keep the seat in either its forward position or its rearward position, a positioning latch 210 is provided. The positioning latch is mounted upon the carriage assembly 194 for movement therewith and comprises a latch element 212 of clevis shape which is mounted at its free ends on a latch shaft 214 which in turn is rotatably mounted in the support member 202. The positioning latch handle 6 is nonrotatably connected with the shaft 214 and is manually operable to actuate the latch element 212. As shown in FIG. 4 and FIG. 10 with the seat in the rearward position, the latch element 212 engages the rear end of the rail 198 when in the latching position. Rotation of the handle 6 lifts the latch element 212 to an unlatched position and the seat 10 is free to travel along the rail to its forward position. With the seat in the forward position the latch element 212 is in the position shown in phantom lines in FIG. 4 and the nose portion 216 thereof is disposed adjacent a stop pin 218 which extends through the rail 198. Thus when the handle 6 is released the latch element 212 will pivot downwardly into engagement with the pin 218 and positively latch the seat in its forward position, i.e. in the position as shown in FIG. 3.

OPERATION

The operation of the inventive mechanism as embodied in the seat 10 will be summarized with reference to the several orientations of the seat. With the seat in the normal orientation, as illustrated in FIG. 1, it is usable as an ordinary forward facing passenger seat in a mobile home or van type camper vehicle. In this orientation it is noted that the seat bottom is inclined at a desired rake angle and the seat back is disposed at a predetermined angularity to provide seating comfort. When it is desired to convert the seat 10 from its normal orientation to the bed orientation, which is shown in FIG. 2, the travel latch 74 is unlatched by rotation of the conversion latch handle 18 in a clockwise direction. With the travel latch released, the seat may be moved forward to the intermediate position of FIG. 5 by means of the translating mechanism which includes the pivot-link 56 and the roller 54 and ramp 53. With the seat in the intermediate position the rake of the seat bottom is eliminated and the travel latch pawl 76 abuts the front striker 100. To complete the conversion to the bed orientation the fold latch 112 is released by counterclockwise rotation of the conversion latch handle 18. This latch actuation rotates the pawl 118 which is mounted on the sector plate 49 out of the path of the tang 114 on the crank plate 68. Accordingly, crank plate 68 is free to rotate in a counterclockwise direction about the hinge pivot 28 and accordingly the seat member 16 is free to rotate therewith toward the prone position. This counterclockwise rotation of the seat member 16 together with the crank plate 68 causes the push-link 130 (see FIG. 6) to thrust the drag-link 132 in the rightward direction as guided by the pivot pin 136 in the guide slot 138. Accordingly, the drag-link 132 moves the cushion holder 30 toward the hinge pivot 28 and closes the gap between the cushion 32 and the cushion 24 with the seat members 14 and 16 in the horizontal position, as shown in FIG. 2. When it is desired to reconvert from the bed orientation to the normal seat orientation the operating procedure just described is reversed; consequently the shift mechanism for the seat member 16 is operated in a reverse manner as the seat member 16 is moved to the erect position and the translating mechanism is operated in a reverse manner as the seat is moved from the intermediate position with no rake to the normal orientation with the seat bottom rake.

When it is desired to place the seat 10 in the reverse orientation, as shown in FIG. 3, for dinette use or the like, the seat is first moved to the intermediate position as described above. With the seat in the intermediate position as shown in FIG. 5 the tilt latch 61 is operated by pulling the latch handle 4 outwardly from the seat. With the latch bar in the latch release position, as shown in FIG. 8, stop pins 174 and 174a mounted on the bar are disposed opposite the stop brackets 172 and 172a respectively and the seat is held in the intermediate position in readiness for tilting to the reverse orientation. Thus with the tilt latch in the release position the sector plate 49 is free to rotate on the carrier 50 about the pivot pin 51; the seat members 14 and 16, being rigidly locked to the sector plate by the fold latch 112, move in unison with each other to the reverse orientation, as shown in FIG. 6. During the tilting motion the cushion holder 30 of seat member 16 is shifted toward the hinge pivot 28 by the shift mechanism which includes the crank plate 68, the push-link 130 and the drag-link 132. Also during the tilting movement the cushion holder 20 is shifted away from the hinge pivot 28 by the shift mechanism which includes a sector plate 49, the follower plate 182 and the push-pull link 190. By this relative shifting of the cushion holders 30 and 20 the cushion 24 of the seat member 14 is caused to overlie the cushion 32 of seat member 16. With the seat in the reverse orientation, as illustrated in FIG. 6, the seat member 16, which is in the seat bottom position, has the desired rake and the seat member 14, which is in the seat back position, has the desired angularity. Also in this position the sector plate 49 is latched against rotation by the latch bar 160 which is returned by the spring 162 to the half-latch position which is illustrated in FIG. 10. Also translation is blocked by the pins 174 and 174a which engage the flanges 172 and 172a, respectively. Accordingly, the seat members 14 and 16 are rigidly secured in position. When it is desired to return the seat 10 to the normal orientation or to the bed orientation the operating procedure just described is reversed in order to first restore the seat to the intermediate position. The reversal of the procedure causes the shift mechanism for the seat members 14 and 16 to operate in a reverse manner so that the cushion holders are shifted back into the relationship shown in FIG. 5.

Although the description of this invention has been given with respect to a particular embodiment it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. A reversible seat adapted to face one direction in a normal seat orientation and adapted to face the other direction in a reverse seat orientation, said seat comprising a base, first and second seat members, one of said members being a seat bottom while the other is a seat back in the normal orientation and vice versa in the reverse orientation, the first and second members including first and second support frames, respectively, connecting means including a linkage extending between said frames to provide a connection therebetween at a desired angularity so as to form a rigid structure with the back edge of the seat bottom frame being adjacent the bottom edge of the back frame, said connecting means being mounted on said base by a pivotal connection adjacent said back edge and said bottom edge, first and second cushion holders shiftably mounted on said first and second support frames, respectively, for motion toward and away from said pivotal connection, first and second means connected with the first and second cushion holders, respectively, for shifting them toward and away from, respectively, said pivotal connection when said members are moved from said normal orientation to said reverse orientation and vice versa.

2. The invention as defined in claim 1 including first and second cushions supported by said first and second cushion holders, respectively, the first seat member being a seat bottom when the seat is in said normal orientation and being a seat back when said seat is in said reverse seat orientation, said second cushion overlying the rear portion of said first cushion in said normal seat orientation, said first and second means being operatively connected with at least one of said frames and with said base so that pivotal motion of said frames about said pivotal connection imparts shifting motion to said cushion holders, the extent of said shifting motion being approximately equal to the thickness of said cushions whereby the first cushion overlies the rear portion of said second cushion when the seat is in said reverse seat orientation.

3. The invention as defined in claim 1 including manually operable tilt latch means having a first element connected with said base and a second element connected with said connecting means whereby said seat may be selectively latched in said normal seat orientation or said reverse seat orientation.

4. The invention as defined in claim 3 wherein said first means comprises linkage means extending between the first cushion holder and one of said frames and being connected with said base, and said second means comprises linkage means extending between said second cushion holder and one of said frames and being connected with said base.

5. The invention as defined in claim 4 wherein at least one of said linkage means comprises articulated rigid link elements.

6. The invention as defined in claim 4 wherein at least one of said linkage means comprises cam means operatively connected with one of said frames and cam follower means operatively connected with one of said cushion holders.

7. The invention as defined in claim 1 including first and second cushions supported respectively on said first and second cushion holders, the cushion of the seat member which is a seat bottom in said normal orientation being closer to said pivotal connection than the cushion of the seat member which is a seat back in said normal seat orientation.

8. The invention as defined in claim 1 including a carrier member movably mounted on said base by translation means adapted to permit movement of said carrier member between forward and rearward positions relative to said base, said frames being mounted on said carrier member by said pivotal connection whereby said seat members are movable with said carrier between a forward and rearward position relative to said base.

9. The invention as defined in claim 8 wherein said first seat member is a seat bottom in the normal seat orientation, said carrier member being in a rearward position relative to said base and supporting said first seat member with a rake extending downwardly toward the rear in said normal seat orientation, said second seat member being the seat bottom in said reverse orientation and being supported by said carrier member in its forward position with a rake extending downwardly and to the rear in said reverse seat orientation.

10. The invention as defined in claim 8 wherein said carrier member is supported on said base by a ramp means and a ramp follower means in engagement with each other and being relatively movable in the fore and aft direction of the seat, said ramp means being connected with said base and said follower means being connected with the carrier member, a pivot link being pivotal in the fore and aft direction and having one end pivotally connected with said base and the other end pivotally connected with said carrier member, said carrier being inclined at a predetermined angle relative to said base when it is disposed in the forward position and being inclined at an angle different from said predetermined angle when it is disposed in the rearward position.

11. The invention as defined in claim 1 including a positioning mechanism for supporting said base on a floor, said positioning mechanism comprising fixed track means adapted to be mounted on said floor, carriage means movably mounted on said track means and connected in supporting relation with said base, and latch means for latching said carriage means to said track means.

12. A reversible seat adapted to face one direction in a normal orientation and to face the other direction in a reverse orientation and being convertible to a bed orientation, said seat comprising a base, first and second seat members including first and second support frames respectively, each member being adaptable for use as a seat bottom or seat back, connecting means joining said frames together to form a seat bottom and back assembly, one of said members being the seat bottom and the other being the seat back, said assembly being mounted on said base by a pivotal connection to said connecting means, said assembly being manually tiltable about said pivotal connection between the normal orientation in which the first member is a seat bottom and the second member is a seat back, and the reverse orientation in which the second member is a seat bottom and the first member is a seat back, tilt latch means operatively connected between the assembly and the base for selectively holding the assembly in the normal or the reverse orientation, said connecting means including pivot means and fold latch means, said fold latch means being releasable to permit folding of one seat member from the seat back position to a prone position to provide a bed orientation of the members, first and second cushion holders shiftably mounted on said first and second support frames, respectively, for motion toward and away from said pivotal connection, first and second shifting means connected with said first and second cushion holders, respectively, for shifting them toward and away from, respectively, said pivotal connection when said members are moved from said normal orientation to said reverse orientation and vice versa, and for shifting them toward the pivotal connection when the members are moved to the bed orientation.

13. The invention as defined in claim 12 including translating means interconnecting said connecting means and said base, said translating means including a carrier member, movable support means mounting said carrier member on said base for movement in the fore and aft direction, said connecting means being mounted on said carrier by said pivotal connection.

14. The invention as defined in claim 12 wherein said connecting means includes a mounting plate, said assembly being mounted on said base by said pivotal connection between said mounting plate and said base.

15. The invention as defined in claim 13 wherein said connecting means includes a mounting plate, said assembly being mounted on said base by said pivotal connection between said mounting plate and said base.

16. The invention as defined in claim 13 wherein said carrier member is at one end of its travel when said seat is in a normal orientation and at the other end of its travel when said seat is in its reverse orientation, said support means for said carrier member, at said one end of its travel, holding said carrier member at an inclination relative to said base to provide the first seat member with a desired rake, said support means for said carrier holding said carrier at a different inclination relative to said base when at said other end of its travel so that said rake of said first seat member is eliminated, whereby said second seat member forms a flat bed surface with said first seat member when said second seat member is folded to said prone position.

17. The invention as defined in claim 15 wherein said carrier member is at one end of its travel when said seat is in a normal orientation and at the other end of its travel when said seat is in its reverse orientation, said support means for said carrier means, at said one end of its travel, holding said carrier member at an inclination relative to said base to provide the first seat member with a desired rake, said support means for said carrier holding said carrier at a different inclination relative to said base when at said other end of its travel so that said rake of said first seat member is eliminated, whereby said second seat member forms a flat bed surface with said first seat member when said second seat member is folded to said prone position.

18. The invention as defined in claim 17 including means for limiting the tilting movement of said assembly about said pivotal connection to said reverse orientation whereby said second seat member is disposed in a seat bottom position with a desired rake.

19. The invention as defined in claim 14 wherein said tilt latch means includes a manually actuable latch element mounted on said base, a latch element on said mounting plate, said manually actuable latch element being engageable with the latch element on the mounting plate for holding the assembly in the normal or reverse orientation.

20. The invention as defined in claim 16 wherein said support means includes ramp means on said base extending in the fore and aft direction and a ramp follower connected with said carrier member and supported by said ramp means, a pivot link pivotal in the fore and aft direction and having one end pivotally connected with said base and the other end pivotally connected with said carrier member, said carrier member being inclined at a predetermined angle relative to said base when disposed in the forward position and being inclined at an angle different from said predetermined angle when disposed in the rearward position.

21. The invention as defined in claim 18 including positioning means for supporting said base on a floor, said positioning means comprising fixed track means adapted to be mounted on said floor, carriage means movably mounted on said track means and connected in supporting relation with said base, and positioning latch means for latching said carriage means to said track means.

22. The invention as defined in claim 17 wherein said first means comprises linkage means extending between the first cushion holder and one of said frames and being connected with said base, and said second means comprises linkage means extending between said second cushion holder and one of said frames and being connected with said base.

23. The invention as defined in claim 22 wherein one of said linkage means comprises articulated rigid link elements and the other of said linkage means comprises cam means operatively connected with one of said frames and cam follower means operatively connected with one of said cushion holders.

24. The invention as defined in claim 18 including first and second cushion holders shiftably mounted on said first and second support frames, respectively, for motion toward and away from said pivotal connection, one of said support frames being rigidly connected with said mounting plate, the other of said support frames being connected with said mounting plate by said pivotal connection, said fold latch means includng a first manually actuable latch element pivotally mounted on said mounting plate and a second latch element connected with said other frame whereby said other frame is foldable to the prone position to provide said bed orientation.

25. The invention as defined in claim 15 including first and second cushion holders shiftably mounted on said first and second support frames, respectively, for motion toward and away from said pivotal connection, one of said frames being rigidly connected to said mounting plate, the other of said frames being connected to said mounting plate by said pivot means, said mounting plate being pivotally mounted on said carrier member for translational movement therewith, first shifting means connected between said other of said frames and said first cushion holder and being actuable by pivotal motion of said other of said frames relative to said carrier member, whereby said first cushion holder is shifted relative to said pivotal connection when changing from any one orientation to any other orientation, and second shifting means connected between said mounting plate and said second cushion holder and being actuable by tilting motion of said assembly whereby said second cushion holder is shifted whenever the assembly is tilted to change between forward and reverse orientation.

26. The invention as defined in claim 25 wherein said mounting plate includes a cam surface, said second shifting means comprises a crank member pivotally mounted on said carrier and including a follower element in engagement with said cam surface, said crank member being connected with said second cushion holder by a pivot-link.

27. The invention as defined in claim 25 wherein said first shifting means comprises a crank member rigidly connected with said other of said frames, a first link and a second link, said first link being connected between said crank member and one end of the second link, said one end of the second link being slidably retained in said carrier member, the other end of said second link being connected with said first cushion holder.

28. The invention as defined in claim 27 wherein said pivot means between said other of said frames and said mounting plate is disposed adjacent the pivotal connection between said mounting plate and said carrier.

29. The invention as defined in claim 28 wherein said pivotal connection between said mounting plate in said carrier is disposed forward of and below said pivot means between said other of said frames in said mounting plate when said seat members are in said forward orientation.

30. The invention as defined in claim 29 wherein said first shifting means draws said first cushion holder toward said pivot means through a predetermined distance during rotation of the other of said frames about said pivot means when changing from a forward seat orientation to a bed orientation, said pivotal connection being located a distance and direction relative to said pivot means such that rotation of said other of said frames about said pivotal connection when changing from a forward orientation to a reverse orientation causes said first cushion holder to be drawn toward said pivot means a distance less than said predetermined distance and causes said pivot means to be disposed below and to the rear of said pivotal connection with the assembly in the reverse orientation whereby said first cushion holder is disposed at a predetermined rake and the cushion holders are adapted to hold respective cushions in overlapping relation with the assembly in the reverse orientation.

* * * * *

UNITED STATES PATENT OFFICE
CERTIFICATE OF CORRECTION

Patent No. 3,964,785      Dated    June 22, 1976

Inventor(s)    Robert W. Plume

Figure 14:
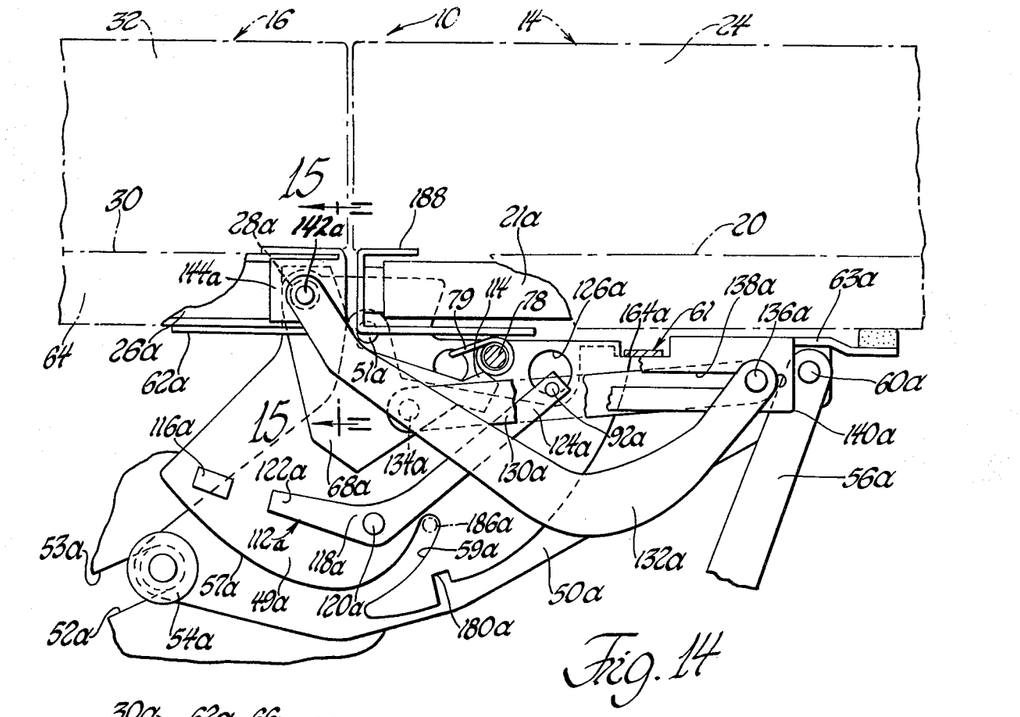
FIG. 14 is a side elevation view of the seat mechanism shown in its bed position and is taken generally along lines 14—14 of FIG. 8.
Figure 15:
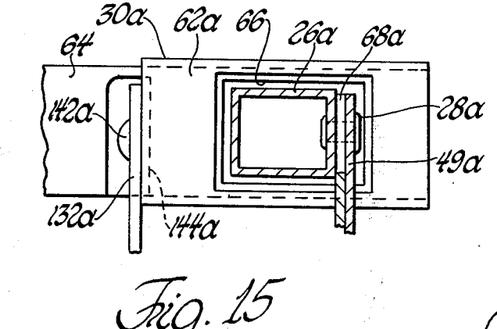
Figure 16:
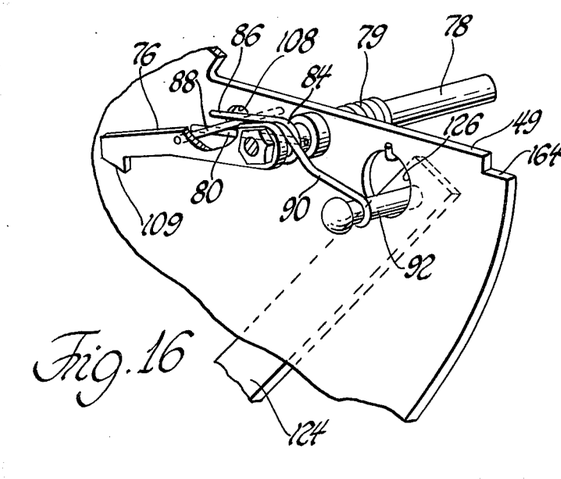

It is certified that error appears in the above-identified patent and that said Letters Patent are hereby corrected as shown below:

Column 4, after line 11, insert --FIGURE 15 is a sectional view taken along lines 15-15 of FIGURE 14; and FIGURE 16 is a perspective view showing a latch mechanism of the seat mechanism.--; column 4, line 30 "S.N. 444,080" should be --S.N. 441,080--. Column 8 line 7, 58" should be --68--; Column 8, line 17, "mechanisms" should be --mechanism--; Column 8, line 37, after "clockwise" insert --direction,--; Column 8, line 37 after "16" insert --,--. Column 9, line 49, after "pawl" insert --118,--; Column 9, line 49, after "16" insert --,--. Column 12, line 38, change "shaft" to --shift--. Column 17, line 50, (Claim 1, line 13) before "back frame" insert --seat--.

Signed and Sealed this

*Eighteenth* Day of *October 1977*

[SEAL]

*Attest:*

RUTH C. MASON      LUTRELLE F. PARKER
*Attesting Officer*      *Acting Commissioner of Patents and Trademarks*